United States Patent [19]

Moriarty

[11] Patent Number: 4,942,934
[45] Date of Patent: Jul. 24, 1990

[54] BELTED CRAWLER HAVING AUXILIARY DRIVE WHEEL

[75] Inventor: Kevin J. Moriarty, Davenport, Iowa
[73] Assignee: Deere & Company, Moline, Ill.
[21] Appl. No.: 169,528
[22] Filed: Mar. 17, 1988
[51] Int. Cl.5 ............................................ B62D 11/04
[52] U.S. Cl. ...................... 180/6.48; 180/6.7
[58] Field of Search ................ 180/6.48, 243, 242, 180/6.2, 6.7

[56] References Cited

U.S. PATENT DOCUMENTS

| | | | |
|---|---|---|---|
| 3,298,252 | 1/1967 | Harris et al. | 74/761 |
| 4,177,870 | 12/1979 | Henn | 180/243 |
| 4,183,419 | 1/1980 | Henn et al. | 180/243 |
| 4,186,816 | 2/1980 | Pfundstein | 180/243 |
| 4,343,680 | 3/1984 | Riediger et al. | 74/682 |
| 4,519,465 | 5/1985 | Triplett | 180/6.2 |
| 4,546,844 | 10/1985 | Stauffer | 180/243 |
| 4,560,018 | 12/1985 | Satzler | 180/9.1 |
| 4,635,743 | 1/1987 | Riehl | 180/243 |
| 4,678,244 | 7/1987 | Furuta et al. | 305/57 |

FOREIGN PATENT DOCUMENTS

WO85/02824  7/1985  PCT Int'l Appl. .

*Primary Examiner*—Charles A. Marmor
*Assistant Examiner*—Karin Tyson

[57] ABSTRACT

A crawler having a friction driven elastomeric belted track which is driven by rear mounted main drive wheels and front mounted auxiliary drive wheels. The auxiliary drive wheels are operatively coupled through hydraulic clutches to hydraulic motors that are fluidically coupled to a reversible variable displacement pump. An electronic controller controls the output of the pump so that the auxiliary drive wheels are driven at a speed less than the main drive wheels in the forward direction at a speed equal to or greater than the speed of the main drive wheels in the reverse direction. A valve assembly selectively couples and decouples the hydraulic clutches for engaging and disengaging the motor when turning the vehicle.

20 Claims, 4 Drawing Sheets

BELTED CRAWLER HAVING AUXILIARY DRIVE WHEEL

BACKGROUND OF THE INVENTION

1. Field of the Invention

The invention is directed to a friction driven belted crawler having main drive wheels located at the rear of the crawler and auxiliary drive wheels located at the front of the crawler. The auxiliary drive wheels are driven at a percentage of the speed of the rear drive wheels.

2. Description of the Prior Art

Conventional crawlers are well known and are typically provided with a steel segmented track consisting of steel tracks shoes that are mounted to a steel track chain. The track chain is positively driven by a drive sprocket which is coupled through a transmission to an internal combustion engine.

It has long been proposed to form endless belted tracks from an elastomeric material. Such tracks have a number of advantages, one such advantage is that the belted tracks permit a crawler to drive over streets and curbs without ripping up the street or curb with the steel grousers of conventional tracks. Two belted track systems are currently being used on construction and agricultural machines. In one design marketed by Bridgestone Co., Ltd., Tokyo, Japan, the track is provided with a series of apertures through which a toothed drive sprocket engages the track for positively driving the track. Each of the apertures is reinforced by a steel insert mounted in the track, see U.S. Pat. No. 4,678,244. The second system is currently being marketed by Caterpillar Tractor Co., Peoria, Ill., on an agricultural tractor, see PCT Application WO Ser. No. 85/02824. With this track system, the belted track engages a rubber coated drive wheel located at the rear of the tractor, and a pneumatic tire idler wheel located at the front of the tractor. The track is put under great tension forces and is friction driven by the drive wheel.

Friction driven belted tracks, such as that on the Caterpillar Tractor Co. agricultural tractor, does not provide comparable performance capabilities in the forward and reverse directions. In the forward direction, the minimum tension in the belt occurs on the top portion of the track, and the maximum tension occurs in the lower portion of the belt as it contacts the drive wheel. In the reverse direction, the opposite is true and maximum tension occurs in the top portion of the belt, and minimum tension occurs in the belt at its lower contact with the drive wheel. Therefore, the tractor has greater forward thrust than reverse thrust.

The maximum thrust potential of this track system is proportional track static pretension. Therefore, with large heavy vehicles, it is necessary to keep the tracks highly tensioned to provide adequate reverse thrust. Higher pretension loading of the track, necessitates increasing the frame structure of the track undercarriage to withstand high tension loadings.

One method of providing more comparable performance characteristics in both the forward and reverse directions is to drive all four wheels of the track. U.S. Pat. No. 4,560,018, to Satzler, discloses using a tandem drive mechanism to drive a jointless elastomeric belt. This proposed mechanism delivers greater torque to the rear wheel assembly than to the front wheel assembly.

Automatic six wheel drive motor graders are being marketed by Deere & Company, Moline, Ill., the assignee of the present patent application, and Dresser Industries, Inc., Houston, Tex., wherein hydraulic wheel motors are used to drive the front wheels, see U.S. Pat. Nos. 4,177,870, 4,183,419 and 4,186,816 to Deere & Company and 4,546,844 and 4,635,743 to Dresser. With these systems, an electronic controller having wheel speed sensors automatically drives the front wheels at a preselected percentage of the rear main drive wheels. The front wheels are either driven in the normal mode at 97–99% of the speed of the main wheels, or in the aggressive mode at 101–103% of the speed of the main wheels. In the normal mode, the front wheels only become engaged when the rear wheels are slipping. In the aggressive mode, the front wheels are constantly trying to pull the machine.

SUMMARY OF THE INVENTION

The present invention provides a hydraulically driven front wheel drive system for a friction driven belted crawler. An internal combustion engine through a transmission is used to drive the main drive wheels. The engine also drives a reversible variable displacement pump for supplying hydraulic fluid to wheel motors used to drive the front auxiliary drive wheels. The fluid output of the pump is controlled by an electronic controller which is provided with speed sensors for sensing the speed of the main drive wheels and the speed of the auxiliary drives. The fluid output is adjusted so that the speed of the auxiliary drive wheels is between 97–99% of the speed of the main drive wheels. In one embodiment, the speed of the auxiliary drive wheels in the forward direction is 97–99% the speed of the main drive wheels, and in the reverse direction the speed of the auxiliary drive wheels is at 100–101% the speed of the main drive wheels.

In the preferred embodiment, each of the wheel motors is provided with a hydraulic clutch for engaging and disengaging the wheel motor to the auxillary drive wheel. The clutches are fluidically coupled to the fluid output of the pump by a valve assembly comprising two pairs of two-position solenoid clutch valves. Each of the valve pairs are associated with one motor. The first valve in the valve pair engages the clutch when the crawler is being driven in the forward direction whereas the second valve in the valve pair engages the clutch when the crawler is being driven in the reverse direction. The two valves in each pair are coupled to one another by a shuttle check valve. The valve assembly is also provided with two two-position solenoid motor valves each valve being associated with one of the motors. The motor valves are used to fluidically isolate the motor from the pump when the motor is disengaged.

When the crawler is steered, one track is slowed, stopped or reversed and the other track is driven performing a skid steer. The steering can be performed by a conventional clutch/brake system, a hydrostatically driven crawler, or a differential steering mechanism, see U.S. Pat. No. 4,434,680. The controller is provided with steering switches which detect the steering command and deactivate the appropriate wheel motor. The steering switches essentially deenergize the appropriate clutch valves and motor valve so that the motor is declutched from the wheel and the motor is isolated from the fluid output of the pump.

The controller is also provided with two sensing assemblies for sensing the speed of the main drive wheels and the idlers. The idler speed sensing assembly comprises two sensors each one sensing the speed of one of the idlers. The sensors are provided with a selection switch that is controlled by the steering assembly so that the speed sensor senses the speed of the driving wheel in the turn. The sensing switch may also be provided with two sensors, one for each main drive wheel but in the preferred embodiment only one switch is provided which senses the output of the transmission before being split between the two main wheels.

DETAILED DESCRIPTION OF THE PREFERRED EMBODIMENT

Figure 1:
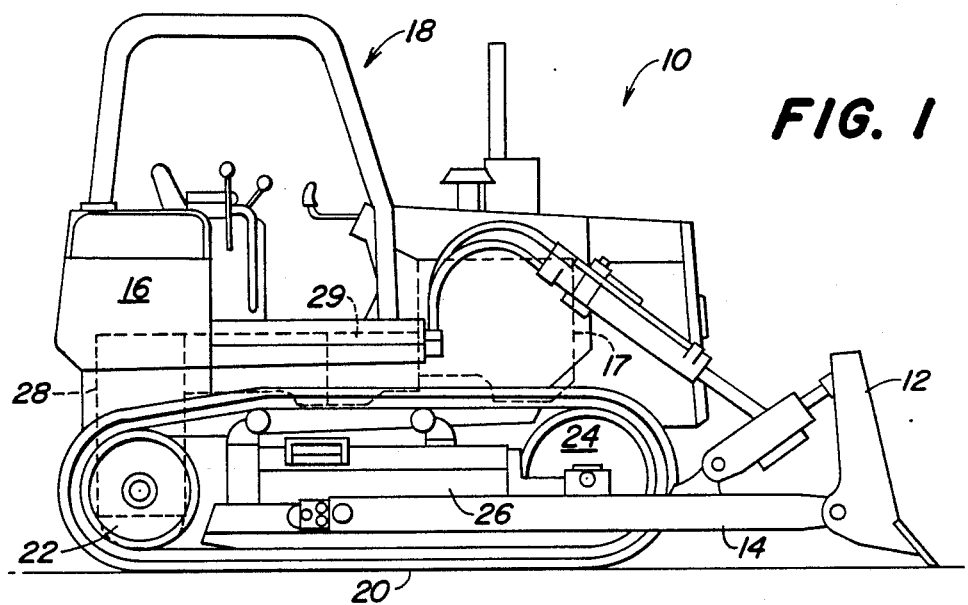
FIG. 1 is a side view of a crawler having jointless elastomeric belted tracks.

FIG. 1 illustrates a crawler vehicle 10 which is provided with a bulldozer blade 12 which is suitably connected to the vehicle by linkage 14. The vehicle is provided with a frame 16 which houses an internal combustion engine 17 shown in phantom lines and defines operators station 18. The vehicle is driven by an elastomeric belted track 20 which operatively engages main drive wheel 22 and auxiliary drive wheel 24. The belted track is tensioned by tension and recoil assembly 26. The belted track is provided with centering guide lugs for guiding the track across the drive wheels, and grousers for frictionally engaging the ground.

The main drive wheels are coupled to a clutch brake steering system 28 (shown in phantom lines) of conventional design which in turn is coupled to a power shift transmission 29 (shown in phantom lines) which is coupled to the output of the engine. The transmission is provided with a main drive clutch 30 (see the hydraulic schematics) which disengages the transmission whenever the clutch pedal in the operator's station is depressed. In addition, the transmission is also provided with a forward drive clutch 32 and a reverse drive brake 34. The forward drive clutch is actuated whenever the direction selection lever located in the operator's station is moved from neutral to place the transmission in the forward driving mode. The reverse drive brake is actuated whenever the direction selection lever is moved from neutral to place the transmission in reverse driving mode. This transmission is similar to the one disclosed in U.S. Pat. No. 3,298,252, which is incorporated herein by reference.

The right and left auxiliary drive wheels 24 are driven by right and left hydraulic wheel motors 36 and 38, respectively. The wheel motors are mounted to the track frame and are provided with right and left hydraulic clutches 40 and 42 which are normally disengaged, but upon coming pressurized engage the output of the wheel motors to the wheels. Each of the wheel motors are provided with right and left electronic speed sensors 44 and 46 which selectively provide an electronic pulse signal that is proportional to the speed of rotation of the motors.

Hydraulic fluid is directed to the wheel motors from reversible variable displacement pump 48 having an upper port connected to one side of a flow divider-combiner valve 50 by supply return line 52. The divider combiner valve has a pair of ports at its opposite side that is connected to the first work ports of wheel motors 36 and 38 by supply return lines 54 and 56, respectively. Supply return lines 54 and 56 are hydraulically connected to one another by restricted line 58. Restricted line 58 assists the flow divider-combiner valve in balancing the hydraulic flow in lines 54 and 56.

The lower port of pump 48 is connected to branched supply return line 60 that fluidically couples pump 48 to the second work ports of motors 36 and 38. As such, a closed loop hydraulic circuit extends between pump 48 and motors 36 and 38 and the latter are connected in parallel to one another.

Pump 48 is a conventional axial piston pump having an angularly adjustable swash plate 62 to which one way hydraulic actuators 64 and 66 are linked to move the swash plate from a centered position to establish forward and rearward pumping conditions.

A pilot operated control valve 68 is connected to actuators 64 and 66 and to pump 70 and includes valve spool 72 which is selectively shiftable to the left or right of the illustrated neutral position for pressurizing actuators 64 and 66. The movement of the valve spool 72 is controlled by linear electrohydraulic actuator 74 having a reciprocal output member 76 which is connected to the spool. Actuator 74 is of a commercially available type which displaces member 76 in direction and magnitude, and in accordance with the direction and magnitude of electronic control signals sent to the actuator and as such controls the magnitude and direction of the displacement of pump 48. A feed back linkage 78 is connected between the swash plate 62 and the valve spool 72 and acts to return the spool 72 to its neutral position in response to swash plate 62 being moved to a new position as commanded by actuator 74.

A hydraulic circuit including valve assembly 80 hydraulically couples the working fluid of motors 36 and 38 to hydraulic clutches 40 and 42. The valve assembly comprises four two-position solenoid clutch valves 82, 84, 86 and 88 which selectively couple the working fluid to the hydraulic clutches. Valves 82 and 84 form a first valve pair for coupling the working fluid to hydraulic clutch 40, whereas clutch valves 86 and 88 form a second pair which are used to selectively couple working fluid to clutch 42. Clutch valves 82 and 88 are forward clutch valves and are used to couple working fluid to the clutches during the forward movement of the vehicle, whereas clutch valves 84 and 86 are used to couple working fluid to the clutches during reverse movement of the vehicle. The clutch valve assembly is also provided with two two-position solenoid motor valves 90 and 92 which selectively isolate the motors from the fluid output of pump 48. Valve assembly 80, as discussed below, can be independent operated so that pump 48 drives both motors simultaneously, or the motors individually as required in turning the machine.

The output of valve pair 82 and 84 is directed to shuttle check valve 94 for directing fluid to hydraulic clutch 40. Similarly, valve pairs 86 and 88 are also provided with shuttle check valve 96 for transmitting fluid to clutch 42. All of the clutch valves and motor valves are normally biased into a checked position, see valves 84 and 88, and motor valve 92 in FIG. 4. When the solenoids of the clutch valves become energized, the spools are shifted to permit working fluid to be directed to the clutch assemblies. Similarly, when the motor valves become energized, as illustrated in FIG. 2, they are shifted to allow working fluid to be directed to the motors.

Figure 2:
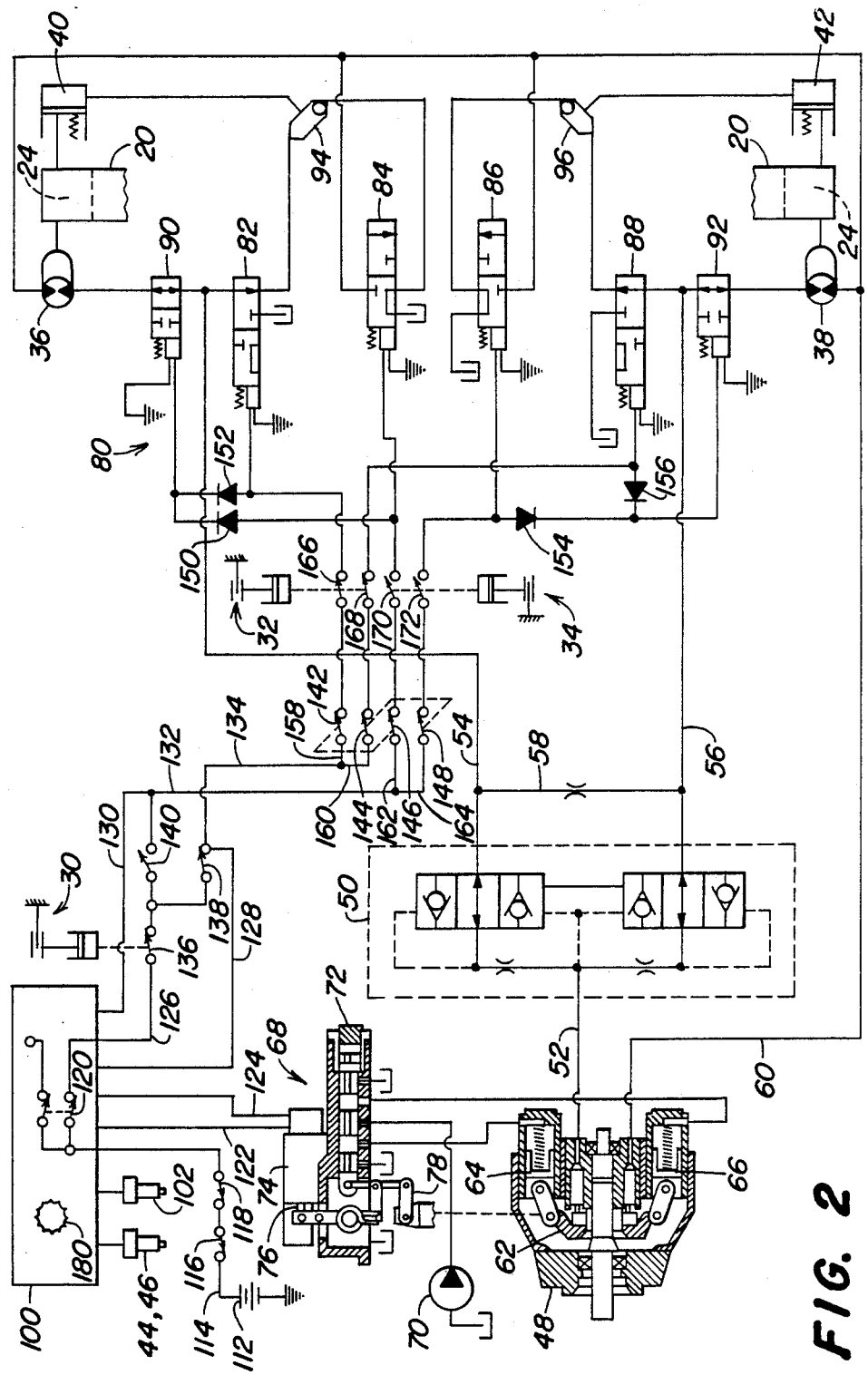
FIG. 2 is a hydraulic and electrical schematic of the invention driving the crawler straight forward.
Figure 3:
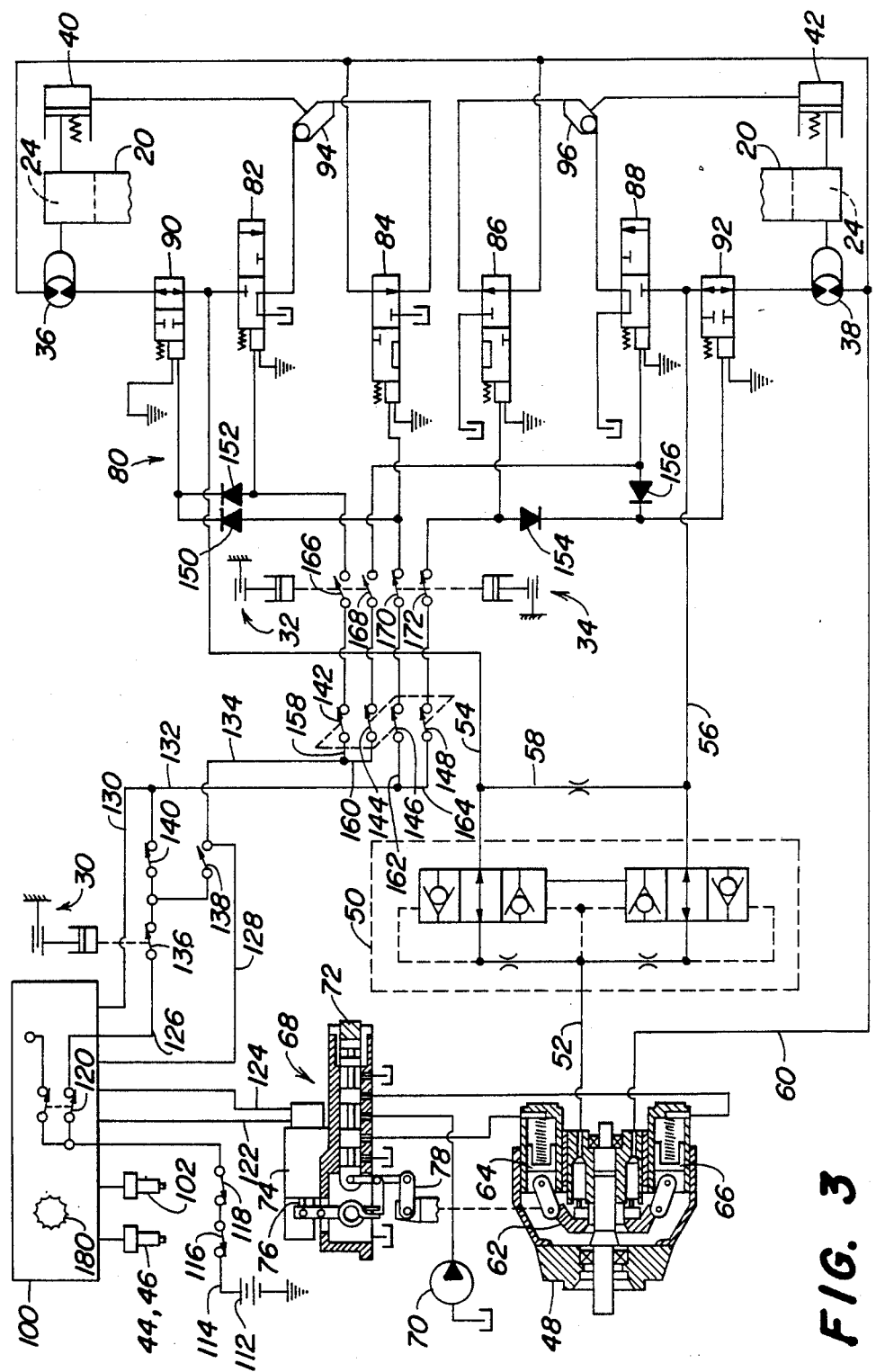
FIG. 3 is a hydraulic and electrical schematic of the invention driving the crawler straight backwards.
Figure 4:
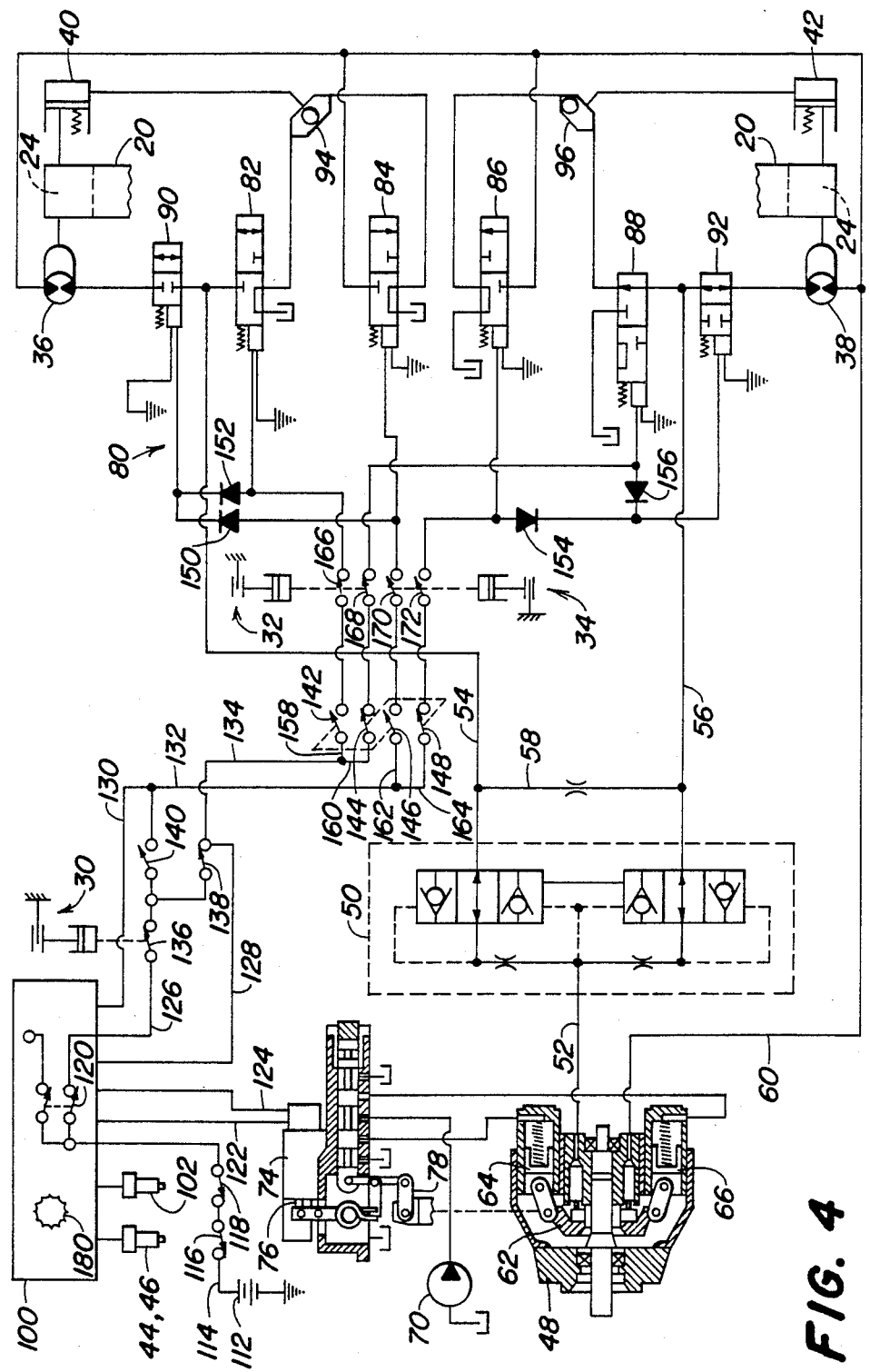
FIG. 4 is a hydraulic and electrical schematic of the invention driving the crawler forward into a turn.

As illustrated in FIG. 2, when the vehicle is being driven straight forward, clutch valves 82 and 88 are energized and clutch valves 84 and 86 are closed. In addition, when driving straight forward, motor valves 90 and 92 are energized permitting fluid to be directed to motors 36 and 38. When traveling in the reverse direction (see FIG. 3), clutch valves 84 and 86 are energized and valves 82 and 88 are not energized. As with the forward direction, the motor valves are also energized. When executing a forward turn as illustrated in FIG. 4, clutch valve 88 is energized whereas clutch valves 82, 84, and 86 are not. In addition, a motor valve 92 is energized and motor valve 90 is not. Therefore, it should be understood that in a turn, only motor 38 is driving the left auxiliary drive wheel and motor 36 is disengaged from the right auxiliary drive wheel which is permitted to free wheel.

As discussed above, the positioning of swash plate 62 in pump 48 is controlled by linear electrohydraulic actuator 74, this actuator is electrically coupled to electronic controller 100 which is disclosed in U.S. Pat. No. 4,186,816, which is incorporated herein by reference. The controller is electrically coupled to main drive wheel speed sensor 102 which electrically signals the controller as to the speed of the main driving wheels. It should be noted that if this main drive wheel sensor is coupled to the wheels output downstream of the clutch brake steering system, then two sensors will be needed to monitor the speed of the main drive wheels during a turn. Therefore, it is more desirable that the main drive speed sensor be located upstream of the steering assembly thereby sensing the output of the transmission before it is applied to the clutch brake assembly. The controller is also electrically coupled to an auxiliary drive wheel speed sensors 44 and 46 which are located at each wheel.

Figure 5:
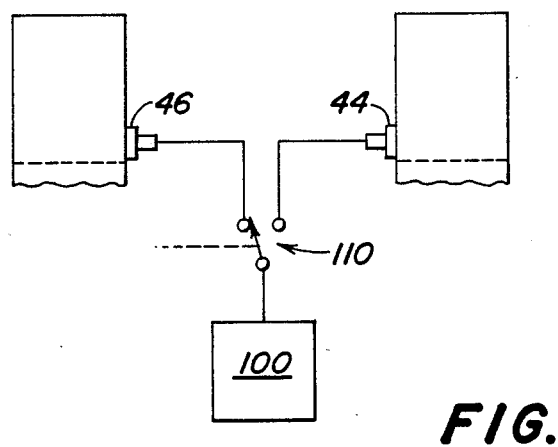
FIG. 5 is an electrical schematic of the sensing assembly for the front idlers.

As shown in FIG. 5, the two sensors are coupled to controller 100 through a selector switch 110 which is operatively coupled to the clutch brake steering assembly. The selector switch is used to insure that the controller is electrically coupled to an auxiliary wheel that is driving the track and not to an auxiliary wheel that has been disengaged. More specifically, when making a left turn, left wheel motor 36 is disengaged and only right wheel motor 38 together with right main wheel are driving the right track. In this situation, if selector switch was coupled to the left wheel sensor, this switch would be automatically shifted to sense the right wheel sensor to insure that the controller is receiving a live wheel input.

The controller is coupled to an electric power supply 112, such as a battery, by electric line 114. Line 114 is coupled to the ignition through ignition switch 116 which is coupled in series with gear shift switch 118 which is coupled to the gear shift lever of the transmission. Ignition switch 116 insures that the controller is not operated unless the machine is turned on. Whereas, gear shift switch 118 insures that the auxiliary drive system is only operated in selective gear ranges. Controller 100 is also provided with an on/off switch 120 which is used by the operator to turn on the auxiliary drive system.

The controller through electric lines 122 and 124 controls the operation of linear electrohydraulic actuator 74. In addition, on/off switch 120 is electrically coupled to electric line 126. The controller is also provided with forward drive input signal lead 128 and reverse drive input signal lead 130. Electric line 126 is divided into forward drive lead 132 and reverse drive lead 134. The main clutch 30 is provided with a pressure responsive switch 136 which is located in electric line 126 for energizing and deenergizing the valve assemblies corresponding to the actuation of main clutch 30. The forward drive lead 132 and the reverse drive leads 134 are both provided with switches 138 and 140, respectively, which are coupled to the transmission shift linkage assembly and determine if the crawler is being driven in a forward or a reverse mode.

Forward drive lead 132 and reverse drive lead 134 are further branched into electric branch lines 158, 160, 162 and 164 which accommodate normally closed brake pedal switches 142, 144, 146 and 148 that are used to selectively engage the valve assembly in response to turning the vehicle. In response to turning the forwardly driven vehicle to the right, as illustrated in FIG. 4, the right track is braked, thereby, opening the normally closed switches 142 and 146 which deenergize clutch valve 82 and motor valve 90. In this way right auxiliary wheel motor 36 is decoupled from the right auxiliary wheel by deenergized clutch valve 82 and isolated from pump 48 by deenergized motor valve 90. Although switches 142, 144, 146 and 148 are described as brake pedal switches, they may be incorporated into non-clutch/brake crawler steering systems.

Motor valves 90 and 92 are coupled to the electronic control circuit through diodes 150, 152, 154 and 156 which electrically isolate the clutch valve pairs from one another while also supplying an energization signal to the motor valves.

Also positioned in electric branch lines 158, 160, 162 and 164 are pressure responsive switches 166, 168, 170 and 172 that are operatively coupled to either the forward drive clutch 32 or reverse drive brake 34.

The controller can be used to drive the auxiliary drive wheel slightly slower than the main drive wheels in the forward direction. It is desirable that the auxiliary drive wheels be driven in a normal mode at a speed slightly less than the main drive wheels, for example, between 97 and 99% of the speed of the main drive wheels. In this way, during forward drive when the rear drive wheel starts to slip in relation to the belt, the auxiliary drive wheels will take hold and provide for better traction. In the reverse direction, it is desirable that the rear wheels be driven in a more aggressive mode, at either 100% speed of the main drive wheels or slightly above in a range of 100-101%.

The controller as disclosed in U.S. Pat. No. 4,186,816 which was incorporated herein by reference, can be operated either in the normal mode or the aggressive mode. This selection is controlled by control switch 180 of controller 100. By electrically coupling switch 180 to forward drive input signal lead 128 and reverse drive input signal lead 130, this switching can be automatically activated by the transmission shift linkage switches 138 and 140. Therefore, in the forward direction the controller is operated in the normal mode and in the reverse direction in the agressive mode.

The hydraulic system discussed above is quite similar to the hydraulic system disclosed in U.S. Pat. Nos. 4,177,870 and 4,183,419, which are incorporated herein by reference. However, the presently described system could be modified to employ an overrunning clutch between the wheel motor and the wheels and a digital control system as disclosed in U.S. Pat. Nos. 4,546,844 and 4,635,793.

The above described invention provides an auxiliary drive system for a friction driven elastomeric belted track vehicle which reduces the tensioning necessary to provide reverse thrust. As such, it is respectfully submitted that the invention should not be limited by the above description or embodiment, but should be limited solely by the claims that follow.

I claim:

1. A crawler vehicle comprising:
   a frame;
   a power unit secured to the frame;
   a main drive wheel connected to the frame;
   an auxiliary drive wheel connected to the frame;
   an endless belted track operatively engaging both drive wheels for propelling said vehicle;
   a transmission for operatively coupling the power unit to the main drive wheel for driving the main drive wheel at a speed;
   a pump operatively coupled to the power unit providing a fluid output;
   a fluid motor operatively coupled to the auxiliary drive wheel, the fluid motor is fluidically coupled to the pump; and
   a controller for controlling the fluid output of the pump so that the fluid motor drives the auxiliary drive wheel at a percentage of the speed for the main drive wheel that is different than the speed of the main drive wheel.

2. A crawler vehicle as defined by claim 1 wherein the pump is a reversible variable displacement pump.

3. A crawler vehicle as defined by claim 2 wherein the percentage at which the auxiliary drive wheels are driven is less than the speed of the main drive wheels.

4. A crawler vehicle as defined by claim 3 wherein the percentage at which the auxiliary drive wheels are driven is between 97% and 99% of the speed of the main drive wheel.

5. A crawler vehicle as defined by claim 2 further comprising a second main drive wheel connected to the frame and is operatively coupled to the transmission; a second auxiliary drive wheel that extends from the frame; a second fluid motor is operatively coupled to the second auxiliary drive wheel and fluidically coupled to the pump; a second endless belted track operatively engages both the second main drive wheel and the second auxiliary drive wheel; and the controller controls the fluid output of the pump to drive both auxiliary drive wheels at a percentage less than the speed of the main drive wheels.

6. A crawler vehicle as defined by claim 5 further comprising means for decoupling one of the fluid motors from the respective auxillary drive wheel when turning the vehicle.

7. A crawler vehicle comprising:
   a frame;
   an engine secured to the frame;
   a pair of main drive wheels connected to opposite sides of the frame;
   a pair of auxiliary drive wheels connected to opposite sides of the frame, each of the auxiliary drive wheels are longitudinally aligned with a corresponding main drive wheel;
   a pair of endless belted tracks, each track operatively engaging one main drive wheel and one auxiliary drive wheel for propelling said vehicle;
   a transmission for operatively coupling the engine to the main drive wheels for driving the main drive wheels at a speed;
   a reversible variable displacement pump operatively coupled to the engine providing a fluid output;
   a pair of hydraulic motors, each motor being operatively coupled to one of the auxiliary drive wheels, the motors are fluidically coupled to the pump;
   a valve assembly fluidically positioned between the pump and the motors for coupling and decoupling the motors from the auxiliary drive wheels; and
   a controller for controlling the fluid output of the pump so that the motors drive the auxiliary drive wheels at a percentage of the speed of the main drive wheels that is different than the speed of the main drive wheels.

8. A crawler as defined by claim 7 wherein each motor is provided with a hydraulic clutch which is selectively fluidically coupled to the fluid output of the pump by the valve assembly.

9. A crawler as defined by claim 8 wherein the valve assembly comprises two solenoid clutch valves, each clutch valve selectively fluidically couples the fluid output of the pump to one of the clutches.

10. A crawler as defined by claim 8 wherein the valve assembly comprises two pairs of two-position solenoid clutch valves wherein each clutch valve pair is fluidically associated with one of the clutches to selectively fluidically couple the fluid output of the pump to the respective clutch.

11. A crawler as defined by claim 10 wherein the first two-position solenoid clutch valve in each pair fluidically couples the fluid output of the pump to the respective clutch when the vehicle is being driven forward, and the second two-position solenoid clutch valve in each pair fluidically couples the fluid output of the pump to the respective clutch when the vehicle is being driven in the reverse direction.

12. A crawler as defined by claim 11 wherein each pair of two-position clutch valves is fluidically interconnected by a shuttle check valve.

13. A crawler as defined by claim 11 wherein the valve assembly is further provided with two additional two-position solenoid motor valves, one of the motor valves being associated with each motor and fluidically positioned so as to selectively fluidically isolate each respective motor from the fluid output of the pump.

14. A crawler as defined by claim 13 further comprising a steering means for steering the vehicle, the steering means is provided with direction switches which selectively deenergize some of the two-position solenoid clutch and motor valves as the vehicle is being turned.

15. A crawler as defined by claim 14 wherein each two-position solenoid motor valve is electrically coupled to one clutch valve pair by a circuit so that if one of the respective valve clutch pair is energized, the two-position solenoid motor valve becomes energized.

16. A crawler as defined by claim 15 wherein the controller is provided with two auxiliary wheel speed sensors, one for each auxiliary drive wheel, the sensors detect the speed of each respective auxiliary drive wheel.

17. A crawler as defined by claim 16 wherein the two auxiliary wheel speed sensors are provided with an auxiliary selection switch for selectively coupling the output of only one of the speed sensors to the controller at any one time.

18. A crawler as defined by claim 17 wherein the auxiliary selection switch is electrically coupled to the steering means for selecting which sensors are to be electrically coupled to the controller.

19. A crawler vehicle comprising:
a frame;
an engine secured to the frame;
a pair of main drive wheels connected to opposite sides of the frame;
a pair of auxiliary drive wheels connected to opposite sides of the frame, each of the auxiliary drive wheels are longitudinally aligned with a corresponding main drive wheel;
a pair of endless belted tracks, each track operatively engaging one main drive wheel and one auxiliary drive wheel for propelling said vehicle;
a transmission for operatively coupling the engine to the main drive wheels for driving the main drive wheels at a speed;
a hydraulic pump means operatively coupled to the engine to provide a fluid output;
a pair of hydraulic motors, each motor being operatively coupled to one of the auxiliary drive wheels, the motor being fluidically coupled to the pump means; and
a controller for controlling the fluid output of the pump so that the motors drive the auxiliary drive wheels forwardly at a percentage less than the speed of the main drive wheels, and drive the auxiliary drive wheels in reverse at a percentage of speed equal to or greater than the speed of the main drive wheels.

20. A crawler as defined by claim 19 further comprising a valve assembly for selectively coupling and decoupling the motors from the auxiliary drive wheels.

* * * * *